United States Patent
Chen et al.

(10) Patent No.: US 11,207,653 B2
(45) Date of Patent: Dec. 28, 2021

(54) FLUID CATALYTIC CRACKING FEED INJECTOR

(71) Applicant: LUMMUS TECHNOLOGY LLC, Bloomfield, NJ (US)

(72) Inventors: Liang Chen, Bloomfield, NJ (US); Peter Loezos, Bloomfield, NJ (US); Hardik Singh, Bloomfield, NJ (US); Rama Rao Marri, Bloomfield, NJ (US); Bryan Tomsula, Bloomfield, NJ (US); Jon Hood, Houston, TX (US); Vish Hariharan, Houston, TX (US); Alan Claude, Houston, TX (US); Justin Breckenridge, Bloomfield, NJ (US); Leonce Castagnos, Bloomfield, NJ (US)

(73) Assignee: LUMMUS TECHNOLOGY LLC, Bloomfield, NJ (US)

( * ) Notice: Subject to any disclaimer, the term of this patent is extended or adjusted under 35 U.S.C. 154(b) by 0 days.

(21) Appl. No.: 17/088,312

(22) Filed: Nov. 3, 2020

(65) Prior Publication Data
US 2021/0129102 A1 May 6, 2021

Related U.S. Application Data

(60) Provisional application No. 62/930,419, filed on Nov. 4, 2019.

(51) Int. Cl.
*B01J 8/00* (2006.01)
*B01J 8/18* (2006.01)
(Continued)

(52) U.S. Cl.
CPC .......... *B01J 8/1818* (2013.01); *B01J 8/1845* (2013.01); *B01J 8/1872* (2013.01); *B01J 38/06* (2013.01);
(Continued)

(58) Field of Classification Search
CPC ..... B01J 8/00; B01J 8/18; B01J 8/1818; B01J 8/1845; B01J 8/1872; B01J 38/00;
(Continued)

(56) References Cited

U.S. PATENT DOCUMENTS 4,650,566 A    3/1987  Buyan et al.
5,108,583 A    4/1992  Keon
(Continued)

FOREIGN PATENT DOCUMENTS

WO    2017072786 A1    5/2017

OTHER PUBLICATIONS

International Search Report issued in PCT/US2020/058688 dated Feb. 22, 2021 (4 pages).

*Primary Examiner* — Natasha E Young
(74) *Attorney, Agent, or Firm* — Osha Bergman Watanabe & Burton LLP

(57) ABSTRACT

A feed injector may have a body having an outer wall and an inner wall with a first conduit formed between the outer wall and the inner wall. The first conduit is configured to receive a atomizing gas. Additionally, a second conduit may be formed by the inner wall, and the second conduit is configured to receive a liquid. The first conduit and the second conduit are separated by the inner wall. Further, a mixing chamber may be provided at an outlet of the first conduit and an outlet of the second conduit. The atomizing gas from the first conduit and the liquid from the second conduit hit and/or mix together in the mixing chamber to form liquid droplets and a mixture of the atomizing gas and the liquid. Furthermore, a flow cone may have a first end in the second conduit and a second end in the mixing chamber.

20 Claims, 4 Drawing Sheets

Fig 2A-C

(51) Int. Cl.
*B01J 38/00* (2006.01)
*B01J 38/04* (2006.01)
*B01J 38/06* (2006.01)
*C10G 11/00* (2006.01)
*C10G 11/14* (2006.01)
*C10G 11/18* (2006.01)

(52) U.S. Cl.
CPC ..... *C10G 11/18* (2013.01); *B01J 2208/00769* (2013.01); *B01J 2208/00823* (2013.01); *B01J 2208/00902* (2013.01)

(58) Field of Classification Search
CPC ........ B01J 38/04; B01J 38/06; B01J 2208/00; B01J 2208/00743; B01J 2208/00769; B01J 2208/00796; B01J 2208/00823; B01J 2208/00893; B01J 2208/00902; C10G 11/00; C10G 11/14; C10G 11/18
See application file for complete search history.

(56) References Cited

U.S. PATENT DOCUMENTS

| | | | |
|---|---|---|---|
| 5,139,748 A | * | 8/1992 | Lomas ................. B01F 5/0415 208/153 |
| 5,240,183 A | | 8/1993 | Bedaw et al. |
| 5,306,418 A | | 4/1994 | Dou et al. |
| 5,692,682 A | | 12/1997 | Soule |
| 5,794,857 A | | 8/1998 | Chen et al. |
| 5,948,241 A | | 9/1999 | Owen |
| 6,012,652 A | | 1/2000 | Holtan et al. |
| 6,179,997 B1 | | 1/2001 | Vedder, Jr. et al. |
| 7,172,733 B2 | | 2/2007 | Gauthier et al. |
| 8,025,792 B2 | | 9/2011 | deLesdernier et al. |
| 2014/0014555 A1 | | 1/2014 | Marri et al. |
| 2015/0028132 A1 | | 1/2015 | Vidusek et al. |
| 2016/0178722 A1 | | 6/2016 | Seelmann-Eggebert |
| 2016/0199805 A1 | | 7/2016 | Lacroix |

* cited by examiner

FLUID CATALYTIC CRACKING FEED INJECTOR

This application claims the benefit of priority under 35 U.S.C. § 119 (a) and (b) to U.S. Provisional Application No. 62/930,419, filed Nov. 4, 2019, the entire contents of which are incorporated herein by reference.

FIELD OF THE DISCLOSURE

Embodiments herein relate generally to fluid catalytic cracking ("FCC"). More particularly, embodiments herein relate to feed injectors or nozzles in a FCC unit which may have oil fed through a conduit thereof. The feed injectors or nozzles provided herein may aid in a dispersion of a hydrocarbon feed.

BACKGROUND

Fluid catalytic cracking ("FCC") is a chemical process that uses a catalyst to create new, smaller molecules from larger molecules to make a refined product, such as gasoline and distillate fuels. An FCC unit may be used to convert hydrocarbon fractions of petroleum crude oils into gasoline, olefinic gases, and other products. Additionally, catalysts used for refining process are composed of different substances such as a solid mixture of crystalline zeolite, matrix, binder, and filler. For example, the different substances may be highly reactive which can significantly speed up the rate of the reaction making them effective catalysts. Typically, the zeolite and matrix are active components while the binder and filler provide additional strength and integrity to the catalyst. The FCC unit may use the catalyst and heat to break apart the large molecules of gas oil into the smaller molecules that make up gasoline, distillate, and other higher-value products like butane and propane.

In conventional methods, various feed injectors or nozzles have been used to feed hydrocarbons to the FCC unit. For example, U.S. Pat. No. 4,650,566 discloses a multiplicity of upwardly extending nozzles located at a bottom of a riser, mixing controlled oil and steam flow in each of the nozzles (the entire teachings of which are incorporated herein by reference). U.S. Pat. No. 5,108,583 discloses a riser injector system usually using five injectors disposed evenly around the periphery of the riser with the introduction of a helical vane type spray nozzle within each nozzle pipe at the outlet conduit of oil stream to form a uniform conical spray to better atomize oil feed (the entire teachings of which are incorporated herein by reference). U.S. Pat. No. 5,240,183 also discloses a spray nozzle with a helical spray configuration at the end of the liquid conduit to facilitate liquid atomization (the entire teachings of which are incorporated herein by reference). U.S. Pat. No. 5,794,857 discloses a feed nozzle including a cylindrical inner steam conduit and an annular outer oil conduit with a first nozzle tip fixedly attached to outlet end of the inner steam conduit for mixing of steam and hydrocarbon oil, and a second nozzle tip attached to the outer oil conduit to atomize the mixture of steam and hydrocarbon oil (the entire teachings of which are incorporated herein by reference). U.S. Pat. No. 6,179,997 discloses employing a perforated-pipe sparger to distribute steam into liquid to atomize oil feed in their atomizer system (the entire teachings of which are incorporated herein by reference). U.S. Pat. No. 5,306,418 discloses a feed nozzle system to atomize hydrocarbon oil feed by adopting multiple different atomization sections, including first charging atomizing gas in radial out-to-in flow into oil stream followed by the mixture discharged onto an impingement plug in an annular expansion region, then sprayed through an orifice outlet (the entire teachings of which are incorporated herein by reference). U.S. Pat. No. 7,172,733 discloses an injection device with a venturi tube to facilitate the atomization of oil (the entire teachings of which are incorporated herein by reference). U.S. Pat. No. 8,025,792 discloses spraying fluid using radially arranged orifices with protruding bosses to prevent erosion of the orifices (the entire teachings of which are incorporated herein by reference). U.S. Pat. No. 5,948,241 discloses mixing oil and steam by bringing in steam externally from annulus into the oil conduit using orifice holes and dispersed the mixture thru an orifice plate impinger for atomization (the entire teachings of which are incorporated herein by reference). U.S. Pat. No. 5,692,682 discloses employing a spiral device to spray the oil stream and externally mix with steam to atomize the oil (the entire teachings of which are incorporated herein by reference). In other applications apart from FCC, U.S. Pat. Pub. No. 2016/0178722 discloses using circular, radially notched discharge orifice to improve surface-to-volume ratio of the spray pattern formed by the nozzle (the entire teachings of which are incorporated herein by reference). Additionally, WIPO Pat. No. PCT/IN2016/050171 discloses mixing steam and hydrocarbon to form an emulsion which is then impinged on guiding edges to form thin film and sheared using gas jets (the entire teachings of which are incorporated herein by reference).

SUMMARY OF THE INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, the embodiments disclosed herein relate to a feed injector that may include a body having an outer wall and an inner wall; a first conduit formed between the outer wall and the inner wall, the first conduit configured to receive a atomizing gas; a second conduit formed by the inner wall, the second conduit configured to receive a liquid, wherein the first conduit and the second conduit are separated by the inner wall; a mixing chamber at an outlet of the first conduit and an outlet of the second conduit, wherein the atomizing gas from the first conduit and the liquid from the second conduit hit and/or mix together in the mixing chamber to form liquid droplets and a mixture of the atomizing gas and the liquid; a flow cone having a first end in the second conduit and a second end in the mixing chamber; an annular path between the inner wall of the second conduit and an outer surface of the flow cone forms a liquid pathway to the outlet of the second conduit, wherein the outlet of the second conduit is form by a gap between an end of the inner wall and the second end of the flow cone, wherein a protrusion at the second end of the flow cone is angled from a central axis of the feed injector at an angle from 0 to 90 degrees; and a discharge channel at an end of the mixing chamber opposite the flow cone.

In another aspect, the embodiments disclosed herein relate to a fluid catalytic cracking unit that may include a vertically disposed riser reactor; a regenerator fluidly coupled to and configured to provide a catalyst or hot particles to the vertically disposed riser reactor; one or more feed injectors disposed in the vertically disposed riser reactor, and the feed injectors may include: a body having an outer wall and an inner wall; a first conduit formed between the outer wall and the inner wall, the first conduit configured to receive an atomizing gas; a second conduit formed by the inner wall, the second conduit configured to receive a liquid feed, wherein the first conduit and the second conduit are separated by the inner wall; a mixing chamber at an outlet of the first conduit and an outlet of the second conduit, wherein the atomizing gas from the first conduit and the liquid from the second conduit mix together in the mixing chamber to form liquid droplets and a mixture of the atomizing gas and the liquid; a flow cone having a first end in the second conduit and a second end in the mixing chamber; an annular path between the inner wall of the second conduit and an outer surface of the flow cone forming a liquid pathway to the outlet of the second conduit, wherein the outlet of the second conduit is formed by a gap between an end of the inner wall and the second end of the flow cone, wherein a protrusion at the second end of the flow cone is angled from a central axis of the feed injector at an angle from 0 to 90 degrees; and a discharge channel at an end of the mixing chamber opposite the flow cone, wherein the liquid droplets and the mixture of the atomizing gas and the liquid enter the vertically disposed riser reactor through the discharge channel of the one or more feed injectors.

In yet another aspect, the embodiments disclosed herein relate to a method that may include flowing an atomizing gas through a first conduit of a feed injector; flowing a liquid through a second conduit of the feed injector, wherein the first conduit and the second conduit are separated by a wall within the feed injector; directing the liquid through a liquid pathway formed by an annular path between the wall and an outer surface of a flow cone within the feed injector, wherein the liquid travels from a first end of the flow cone in the second conduit to a second end the flow cone in a mixing chamber of the feed injector; exiting the liquid into the mixing chamber through an outlet of the second conduit formed a gap between an end of the wall and the second end of the flow cone, distributing the liquid into the mixing chamber with a protrusion at the second end of the flow cone angled from a central axis of the feed injector at an angle from 0 to 90 degrees; exiting the atomizing gas into the mixing chamber through an outlet of the first conduit; combining the liquid from the second conduit and the atomizing gas from the first conduit in the mixing chamber to form liquid droplets resulting in a mixture of the atomizing gas and the liquid droplets; and discharging the mixture of the atomizing gas and the liquid droplets through a discharge channel of the feed injector at an end of the mixing chamber opposite the flow cone.

It is an advantage of embodiments herein in that improved dispersion of fluids within the FCC units may be obtained to enhance FCC performance. It is a further advantage that the feed injectors or nozzles according to some embodiments herein may offer better dispersion characteristics than those structures disclosed in the prior art. Other aspects and advantages will be apparent from the following description and the appended claims.

DETAILED DESCRIPTION

Figure 1:
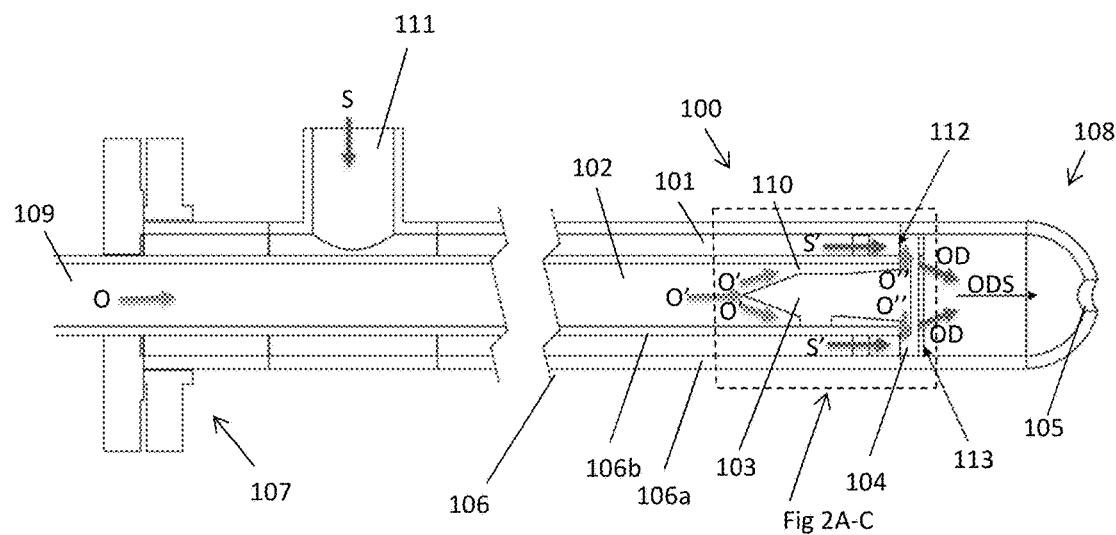
FIG. 1 illustrates a schematic cross section of a fluid catalytic cracking feed injector in accordance with one or more embodiments of the present disclosure.

Embodiments of the present disclosure are described below in detail with reference to the accompanying figures. Like elements in the various figures may be denoted by like reference numerals for consistency. Further, in the following detailed description, numerous specific details are set forth in order to provide a more thorough understanding of the claimed subject matter. However, it will be apparent to one having ordinary skill in the art that the embodiments described may be practiced without these specific details. In other instances, well-known features have not been described in detail to avoid unnecessarily complicating the description.

In one aspect, embodiments disclosed herein relate to a feed injector or nozzle for fluid catalytic cracking ("FCC"). As used herein, the term "coupled" or "coupled to" or "connected" or "connected to" may indicate establishing either a direct or indirect connection, and is not limited to either unless expressly referenced as such. As used herein, fluids may refer to liquids, gases, and/or mixtures thereof. Wherever possible, like or identical reference numerals are used in the figures to identify common or the same elements. The figures are not necessarily to scale and certain features and certain views of the figures may be shown exaggerated in scale for purposes of clarification.

Feed injectors, according to embodiments herein, are apparatuses that include multiple conduits, arranged between walls, for a flow of liquids and gases in corresponding conduits. Additionally, a flow cone may be provided in a conduit of the feed injector to distribute liquids in the conduit to contact gases from another conduit. Further, a mixing chamber may be provided for liquids and gases from corresponding conduits to come into contact with each other. In a non-limiting example, feed injectors, according to embodiments herein, may be used to improve the dispersion of hydrocarbon oil contacting steam to form small and uniform oil droplets to then be sprayed into a catalyst stream at a bottom of a riser in a FCC unit. Feed injectors may be an important component in a FCC unit to introduce feed to the riser. In the FCC process, hot catalyst, such as steam, from a regenerator travels through a regenerator stand pipe to enter the bottom of the riser. Liquid, such as oil, is fed through the feed nozzles to form small oil droplets, contacting the hot catalyst particles. The oil droplet size and distribution, oil spray pattern, and contact with the catalyst significantly affect the evaporation of oil feed and consequent reaction performance in the riser. In one or more embodiments, a plurality of feed injectors may be installed at a bottom of a riser to optimally distribute oil droplets into the riser to contact hot catalyst to enhance reaction performance.

Figure 2A:
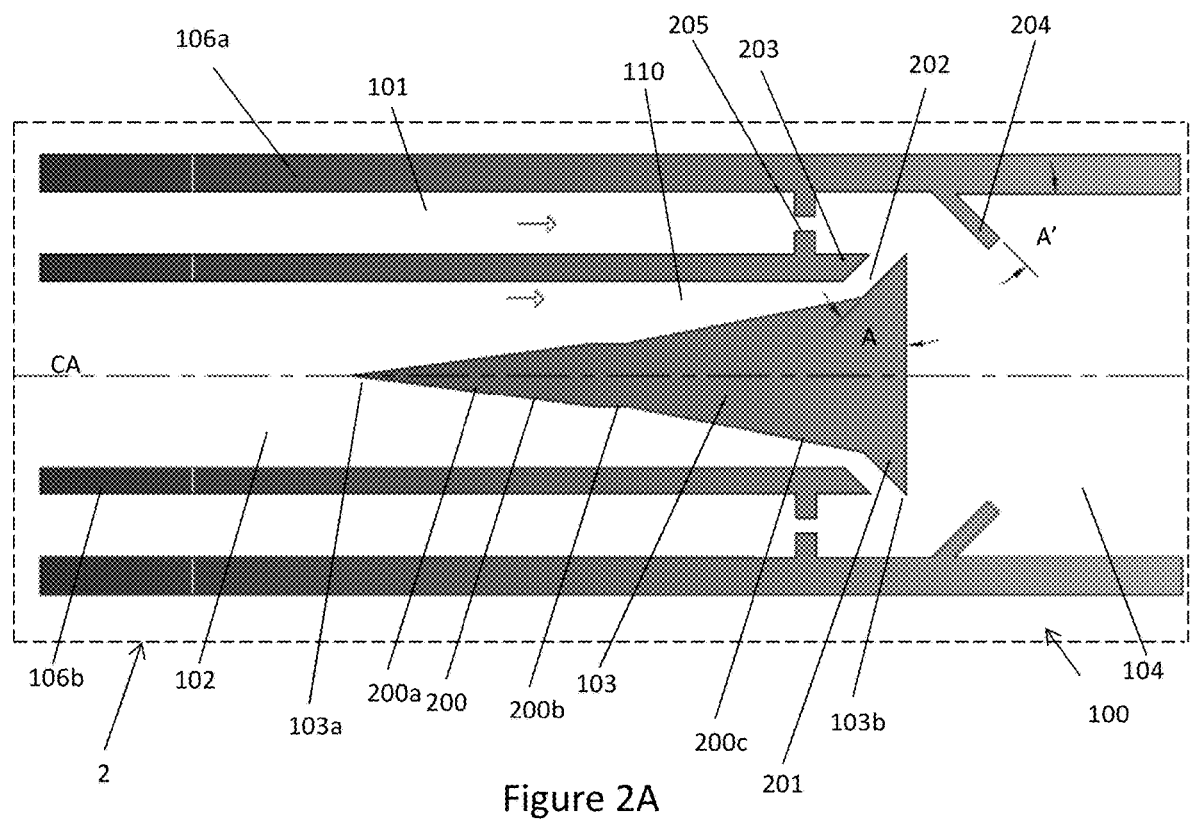
FIGS. 2A-2D illustrate a schematic cross section of a feed injector in accordance with one or more embodiments of the present disclosure.
Figure 2B:
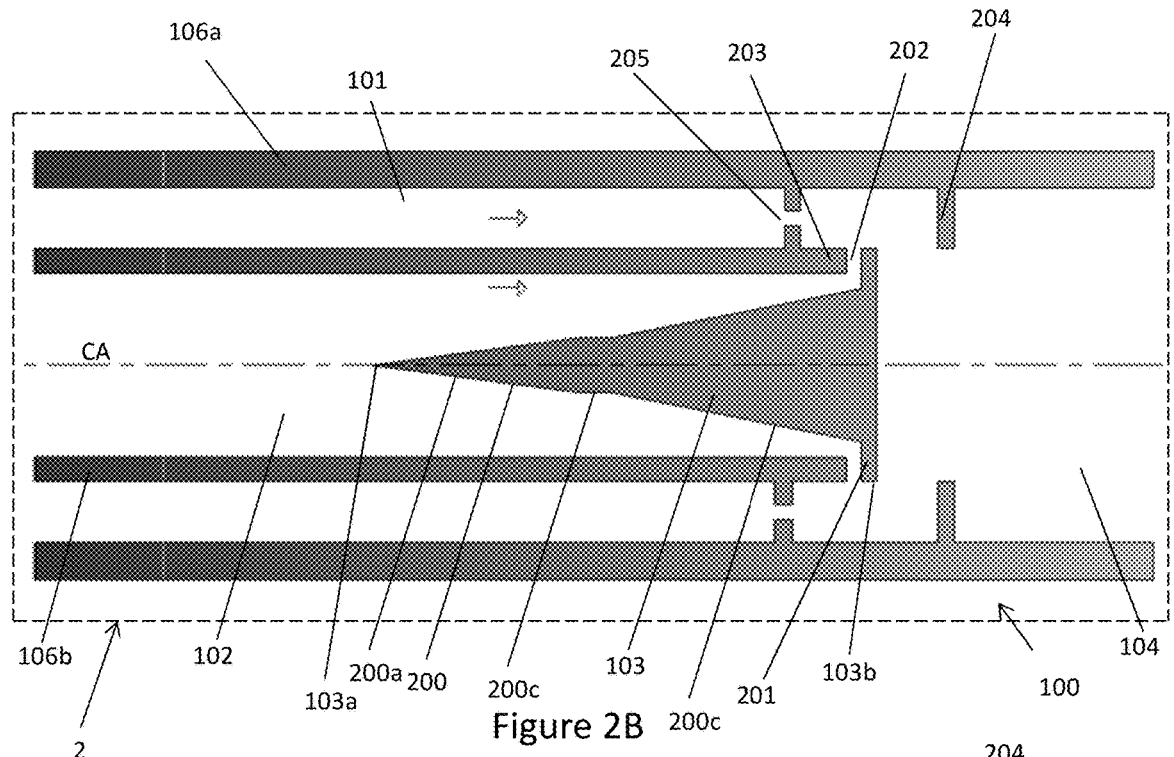
Figure 2C:
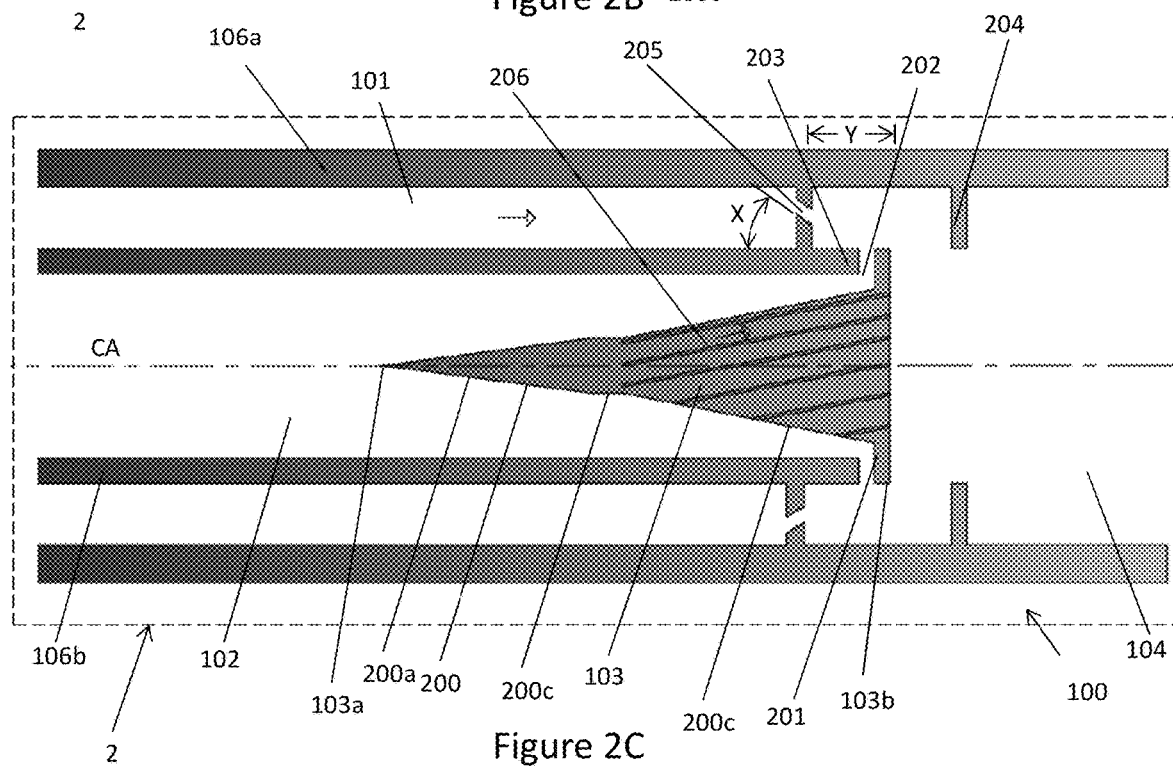
Figure 2D:
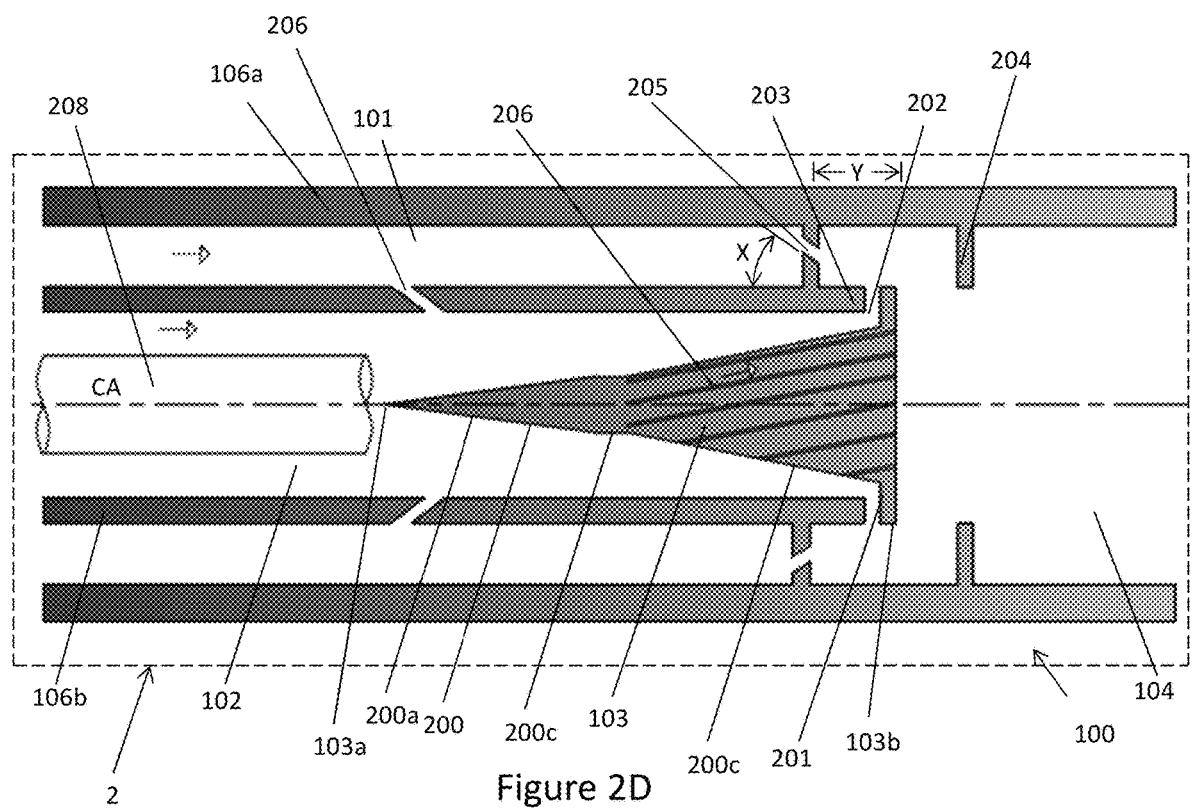

With reference to FIGS. 1-2D, embodiments herein include a feed injector 100 that may have a first conduit 101 and a second conduit 102 to feed fluids into a riser of a FCC unit. In some embodiments, a flow cone 103 may be provided in the feed injector 100 such that fluids exiting the first conduit 101 are distributed into a mixing chamber 104 to contact fluids exiting the second conduit 102. Additionally, it is also envisioned that a discharge channel 105 may be aligned with a mixing chamber 104 for the fluids to exit the feed injector 100. In addition, an inner wall 106*b* may separate the first conduit 101 from the second conduit 102.

Furthermore, a spatial relationship between the inner wall 106b and the flow cone 103 may create a fluid pathway for the fluids in the second conduit 102 to travel through and exit into the mixing chamber 104. Flow paths, catalyst contact, fluid mixing and dispersion, and fluid distribution of the feed injector 100 may be determined by the spatial relationship between the inner wall 106 and the flow cone 103 in the feed injector 100. Flow cone 103 may be suspended and spaced from the end of inner wall 106b via one or more connections (not shown) extending from or proximate an end of inner wall 106b.

Turning to FIG. 1, FIG. 1 illustrates the feed injector 100 in accordance with one or more embodiments of the present disclosure. While only one feed injector 100 is shown, a plurality of feed injectors may be arranged together to combine multiple streams without departing from the scope of the present application. In some embodiments, the feed injector 100 may have a body 106 with an outer wall 106a and the inner wall 106b. The body 106 may extend from a first end 107 to a second end 108. It is further envisioned that the second end 108 may be rounded to have an opening (i.e., the discharge channel 105) at a peak of the rounded end. While it is noted that second end 108 is shown as rounded in FIG. 1, one skilled in the art will appreciate how second end 108 may be any shape without departing from the scope of the present disclosure. Additionally, the opening (i.e., the discharge channel 105) may be at other positions on the body 106 other than the peak of the rounded end without departing from the scope of the present disclosure. It is further envisioned that the feed injector 100 may have more than just one opening without departing from the scope of the present disclosure. The discharge channel 105 may be an outlet such that the feed injector 100 sprays oil droplets to a riser.

In one or more embodiments, the outer wall 106a may have a cylindrical shape to make the body 106 a cylinder. One skilled in the art will appreciate how the body 106 of the feed injector 100 may be any polygon shape other than a cylinder without departing from the scope of the present application. The outer wall 106a may surround the first conduit 101 such that the first conduit 101 forms a first stream between the outer wall 106a and the inner wall 106b. Further, the inner wall 106b may surround the second conduit 102 such that a second stream is formed in between the inner wall 106b and the inner wall 106b separates the first conduit 101 from the second conduit 102. In a non-limiting example, these two separate streams entering the feed nozzle may carry one stream of a liquid feed (e.g., hydrocarbons) and the other stream of atomizing gas (e.g., steam). It is further envisioned that the outer wall 106a and the inner wall 106b may be coaxially aligned with a central axis of the feed injector 100.

Still referring to FIG. 1, in one or more embodiments, oil may be introduced within the second conduit 102 from a liquid inlet 109 at the first end 107 of the feed injector 100. The oil may flow in a direction (see arrows O) from the liquid inlet 109 to enter the second conduit 102. As the oil flows through the second conduit 102, the oil may be channeled (see arrows O') through a liquid flow path formed by a gap 110 between the inner wall 106b and the flow cone 103. From the liquid flow path (i.e., gap 110), the oil may exit (see arrows O") the second conduit 102 into the mixing chamber 104. One skilled in the art will appreciate how channeling the oil through the liquid flow path (i.e., gap 110), the oil may be evenly distributed into the mixing chamber 104 to facilitate an atomization of the oil.

In some embodiments, steam may be introduced within the first conduit 101 from a gas inlet 111 between the first end 107 and the second end 108 of the feed injector 100. The steam may flow in a direction (see arrows S) from the gas inlet 111 to enter the first end 107. As the steam flows through the first end 107, the steam may exit (see arrows S') the first conduit 101 into the mixing chamber 104 to mix and/or disperse 112 with the oil from the second conduit 102. One skilled in the art will appreciate how the steam contacting the oil in the mixing chamber 104 may create a process of atomization 113 of the oil. With the atomization 113 of the oil from the steam, oil droplets may flow (see arrows OD) out of the mixing chamber 104 and be sprayed (see arrows ODS) out of the feed injector 100 through the discharge channel 105. It is further envisioned that the discharge channel 105 may feed the oil droplets into a riser of an FCC unit.

Now referring to FIGS. 2A-2D, in one or more embodiments, a close up of the mixing chamber (dashed box) in FIG. 1 is illustrated, providing a view of the flow cone 103 within the feed injector 100. The flow cone 103 may extend from a first end 103a within the second conduit 102 to a second end 103b within the mixing chamber 104. Additionally, an outer surface 200 of the flow cone 103 may progressively get larger from the first end 103a to the second end 103b such the flow cone has a minimum width at the first end 103a and a maximum width at the second end 103b. It is further envisioned that the outer surface 200 may have various lengths (200a, 200b, 200c) with different or the same angles or slopes. In a non-limiting example, the outer surface 200 may have a first length 200a extending from the first end 103a to a start of a second length 200b, in which the second first length 200a extends to a third length 200c. The third length 200c may extend from an end of the second first length 200a to a protrusion 201 at the second end 103b of the flow cone 103.

One skilled in the art will appreciate that as the oil passes through the liquid flow path (i.e., gap 110) along the outer surface 200 of the flow cone 103, the oil stream may be evenly distributed to facilitate easier disintegration down the liquid flow path (i.e., gap 110) by forming thin oil film, ligament and then droplet. The liquid flow path (i.e., gap 110) may be formed by an annular path between the inner wall 106b from the second conduit 102 and the outer surface 200 of the flow cone 103. This annular path may be varied to achieve different velocity and distribution of the exiting oil by having different angles or slopes of the various lengths (200a, 200b, 200c) of the outer surface 200 of the flow cone 103.

In one or more embodiments, an outlet 202 of the second conduit 102 may be formed by a gap between the second end 103b of the flow cone 103 and an end 203 of the inner wall 106b. It is further envisioned that the gap may be varied to manipulate exiting oil film/ligament thickness to allow for maximum contact area between oil feed (i.e., the second conduit 102) and atomizing steam (i.e., the first conduit 101). In a non-limiting example, the protrusion 201 at the second end 103b of the flow cone 103 may be angled off a central axis CA such that the oil may be introduced into the mixing chamber 104 to directly hit or mix with the atomizing gas and facilitate oil droplet formation via inertial and shear force. An angle A of the protrusion 201 may be any angle between 0 and 90 degree without departing from the scope of the present disclosure. Further, the atomizing steam may exit the first conduit 101 through an outlet 205 before the outlet 202 of the second conduit 102. One skilled in the art will appreciate how a geometry and size of the flow cone 103 may be varied to modify a way of oil feed from the second conduit 103 contacting with the inner wall 106b, determining how the oil flows through the liquid flow path (i.e., gap 110) to achieve optimal atomization, and desired kinetic energy and minimize energy loss.

Referring to FIG. 2A, the angle A of the protrusion 201 is illustrated at an angle of 45 degrees while FIGS. 2B-2D illustrate the angle A of the protrusion 201 at an angle of 90 degrees. As further shown in FIG. 2C, a portion of the outer surface 200 of the flow cone 103 may have a plurality of swirl vanes 206. The plurality of swirl vanes 206 may smoothly change a direction of oil stream and divide the oil stream into smaller jets/sheets. By having the plurality of swirl vanes 206, the oil from the second conduit 102 may then directly hit or contacted with individual atomizing steam from the first conduit 101 in a more head-to-head or perpendicular direction rather than a side-by-side or shear direction. One skilled in the art will appreciate how the plurality of swirl vanes 206 may lead to better oil breakup and atomization to form finer oil droplet size. It is further envisioned that an angle and direction of the plurality of swirl vanes 206 may be optimized to achieve various exit velocities and angles depending upon desired balance between available pressure drop and atomization. Furthermore, the outlet 205 of the first conduit 101 may be angled to achieve optimal effect of atomization by directly contacting thin oil jet/film exiting the second conduit 102 and minimizing energy loss in addition to the plurality of swirl vanes 206. In a non-limiting example, the outlet 205 of the first conduit 101 may be angled at an angle of attack X (i.e., the angle at which the atomizing steam is directed toward the oil film flowing from outlet 202) from 0 to 90 degrees. Additionally, a distance of attack Y may be a variable distance from the outlet 205 of the first conduit 101 to the point at which the atomizing steam contacts the oil. One skilled in the art will appreciate how the plurality of swirl vanes 206 may maintain an operational performance of the feed injector 100 by providing mechanical stability by ensuring that the outlet 202 of the second conduit 102 is not changed or affected during the operating life of the feed injector 100 due to operational upsets or long term affects like fatigue or erosion.

In one or more embodiments, FIG. 2D shows one or more additional streams may be added to the second conduit 102 for pre-mixing within the second conduit 102. In a non-limiting example, the inner wall 106b may include an opening 207. The opening 207 may allow for a portion of the atomizing steam flowing in the first conduit 101 to exit the first conduit 101 and enter the second conduit 102 before the outlet 205 of the first conduit 101. It is further envisioned that one or more additional streams may be directly added such that there is a gas flow 208 within the second conduit 102 upstream of the flow cone 103.

As further shown in FIGS. 2A-2D, steam, serving as an atomizing gas, may be introduced from the first conduit 102 between an annular space between the outer wall 106a and the inner wall 106b of the body 106. In a non-limiting example, the exiting oil from the second conduit may contact with the steam from the first conduit 102 as high velocity steam, resulting in liquid break up due to a high relative velocity and shear force between two streams and creating gas liquid dispersion. It is further envisioned that geometry of a steam pathway in the first conduit 102 may be varied to have an effect on the velocity with which the gas is hitting/shearing the oil, consequently affecting mixing/breakup of the oil.

Still referring to FIGS. 2A-2D, in one or more embodiments, the feed injector 100 may include one or more impingement plates 204 may protrude from the outer wall 106a and extend into the mixing chamber 104. One skilled in the art will appreciate how the one or more impingement plates 204 may further help breakdown the bigger droplets into finer size. It is further envisioned that a position, height and angle of the one or more impingement plates 204 may be varied to affect velocity with which the mixture hits the plate to cause final breakup. In a non-limiting example, the one or more impingement plates 204 may be angled from the outer wall 106a at an angle A' matching the angle A of the protrusion 201 of the flow cone 103. Additionally, the geometric variations within the feed injector 100 as described in FIGS. 2A-2D may be made together or in different combinations to achieve finest droplet formation and homogeneous distribution.

Figure 3:
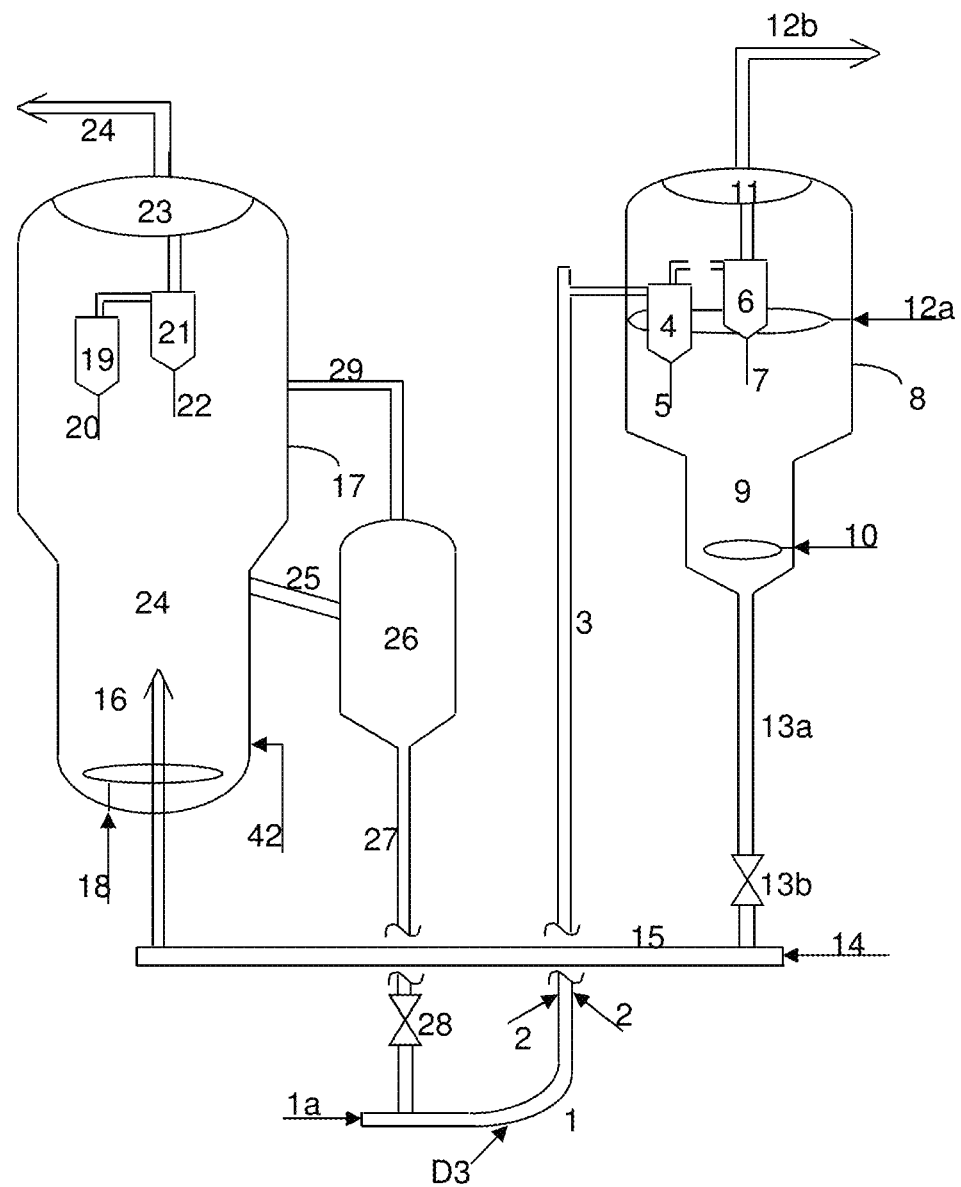
FIG. 3 illustrates a schematic view of a feed injector positioned in a fluid catalytic cracking unit in accordance with one or more embodiments of the present disclosure.

Referring to FIG. 3, in one or more embodiments, FIG. 3 shows one or more feed injector(s) 100, as described in FIGS. 1-2D, positioned at a bottom of a riser 501 of a FCC unit 500. Additionally, the one or more feed injector(s) 100 may be fixed or removably attached to the riser 501 by welding, crimping, adhesives, or mechanical fasteners known in the art. While it is noted that FIG. 3 shows the one or more feed injector(s) 100 in the FCC unit 500, this is merely for non-limiting example purposes only. One skilled in the art will appreciate how the one or more feed injector(s) 100 may be used in a wide variety of applications other than FCC Applications without departing from the scope of the present disclosure.

Further shown by FIG. 3, a simplified process flow diagram of processes for cracking hydrocarbons and producing light olefins according to embodiments disclosed herein is illustrated. A hydrocarbon feed, such as a gas oil, is injected through one or more feed injectors 2, such as an injector as illustrated in any one of FIGS. 1-2D, located near the bottom of a riser reactor 3. The hydrocarbon feed contacts hot regenerated catalyst introduced through a J-bend 1. The catalyst, for example, can be a Y-type zeolite based catalyst, which may be used alone or in combination with other catalysts, such as ZSM-5 or ZSM-11.

The heat required for vaporization of the feed and/or raising the temperature of the feed to the desired reactor temperature, such as in the range from 500° C. to about 700° C., and for the endothermic heat (heat of reaction) may be provided by the hot regenerated catalyst coming from the regenerator 17. The pressure in first riser reactor 3 is typically in the range from about 1 barg to about 5 barg.

After the major part of the cracking reaction is completed, the mixture of products, unconverted feed vapors, and spent catalyst flow into a two stage cyclone system housed in cyclone containment vessel 8. The two-stage cyclone system includes a primary cyclone 4, for separating spent catalyst from vapors. The spent catalyst is discharged into stripper 9 through primary cyclone dip leg 5. Fine catalyst particles entrained with the separated vapors from primary cyclone 4 are separated in second stage cyclone 6. The catalyst collected is discharged into stripper 9 via dip leg 7. The vapors from second stage cyclone 6 are vented through a secondary cyclone outlet connected to plenum 11, and are then routed to a main fractionator/gas plant (not illustrated) through reactor vapor line 12b for recovery of products, including the desired olefins. If necessary, the product vapors are further cooled by introducing light cycle oil (LCO) or steam via distributor line 12a as a quench media.

The spent catalyst recovered via dip legs 5, 7 undergoes stripping in stripper bed 9 to remove interstitial vapors (the hydrocarbon vapors trapped between catalyst particles) by countercurrent contacting of steam, introduced to the bottom of stripper 9 through a steam distributor 10. The spent catalyst is then transferred to regenerator 17 via the spent catalyst standpipe 13a and lift line 15. Spent catalyst slide valve 13b, located on spent catalyst standpipe 13a is used for controlling catalyst flow from stripper 9 to regenerator 17. A small portion of combustion air is introduced through a distributor 14 to help smooth transfer of spent catalyst.

Coked or spent catalyst is discharged through spent catalyst distributor 16 in the center of the dense regenerator bed 24. Combustion air is introduced by an air distributor 18 located at the bottom of regenerator bed 24. Coke deposited on the catalyst is then burned off in regenerator 17 via reaction with the combustion air. Regenerator 17, for example, may operate at a temperature in the range from about 640° C. to about 750° C. and a pressure in the range from about 1 barg to about 5 barg. The catalyst fines entrained along with flue gas are collected in first stage cyclone 19 and second stage cyclone 21 and are discharged into the regenerator catalyst bed through respective dip legs 20, 22. The flue gas recovered from the outlet of second stage cyclone 21 is directed to flue gas line 24 via regenerator plenum 23 for downstream waste heat recovery and/or power recovery.

Regenerated catalyst is withdrawn into a Regenerated Catalyst (RCSP) hopper 26 via withdrawal line 25, which is in flow communication with regenerator 17 and regenerated catalyst standpipe 27. The catalyst bed in the RCSP hopper 26 floats with regenerator 17 bed level. The regenerated catalyst is then transferred from RCSP hopper 26 to riser reactor 3 via regenerated catalyst standpipe 27, which is in flow communication with J-bend 1. The catalyst flow from regenerator 17 to riser reactor 3 may be regulated by a RCSP slide valve 28 located on regenerated catalyst standpipe 27. The opening of slide valve 28 is adjusted to control the catalyst flow to maintain a desired top temperature in riser reactor 3.

In addition to lift steam, a provision may also be made to inject feed streams such as $C_4$ olefins and naphtha or similar external streams as a lift media to J-bend 1 through a gas distributor 1a located at the Y-section for enabling smooth transfer of regenerated catalyst from J-bend 1 to riser reactor 3. Injector 1a may also be an injector according to embodiments herein, such as illustrated in any of FIGS. 1-2D. Additional feed injectors J-bend 1 may also act as a dense bed reactor for cracking $C_4$ olefins and naphtha streams into light olefins at conditions favorable for such reactions, such as a WHSV of 0.5 to 50 $h^{-1}$, a temperature of 640° C. to 750° C., and residence times from 3 to 10 seconds. J-bend 1 diameter (D3) or size is varied to achieve these conditions. The J-bend diameter may be varied between 1 to 3 times of a typical regenerated catalyst standpipe diameter, for example. While not illustrated, the steam and hydrocarbons fed to injectors 1a and 2 may be provided from steam generators, storage tanks, and the like, as is known in the art.

While FIG. 3 shows feed injectors 2 (100) attached to the riser reactor 3, one skilled in the art will appreciate how the present disclosure is not limited to just one feed injector or location of feed injectors, and may have additional feed injectors without departing from the scope of the present disclosure. Additionally, the multiple feed injectors 100 may have same or different structures (configurations described in FIGS. 1-2D), and may be optimized in configuration to account for the feed being processed within the injector (e.g., naphtha, light cycle oil, gas oil, etc.). It will further be appreciated that feed injectors may be placed at various heights of the riser reactor.

Furthermore, methods of the present disclosure may include use of the feed injector 100 and other structures, such as in FIGS. 1-3 for providing liquid droplets in FCC units. Because methods disclosed herein may apply to any of the embodiments, reference numbers are not referenced to avoid confusion of the numbering between the different embodiments.

According to embodiments of the present disclosure, an atomizing gas, such as steam, may be fed into a feed injector through an inlet of a first conduit. The atomizing gas then flows through the first conduit of the feed injector. Concurrently or before feeding the steam in the first conduit, a liquid, such as hydrocarbon oil, may be fed into the feed injector through an inlet of a second conduit, such as from a feedstock tank. The liquid flows through the second conduit of the feed injector. Additionally, the liquid in the second conduit may be directed through a liquid pathway formed by an annular path between the wall and an outer surface of a flow cone within the feed injector. Further, the liquid may travel from a first end of the flow cone in the second conduit to a second end the flow cone in a mixing chamber of the feed injector.

In some embodiments, a direction of the liquid flow may be changed in the liquid pathway with a plurality of vanes on a portion of the outer surface of the flow cone. Next, the liquid may exit into the mixing chamber through an outlet of the second conduit formed a gap between an end of the wall and the second end of the flow cone. Is it further envisioned that the liquid may be distributed into the mixing chamber with a protrusion at the second end of the flow cone angled from a central axis of the feed injector at any angle from 0 to 90 degrees. Concurrently, the atomizing gas may exit into the mixing chamber through an outlet of the first conduit. With both the liquid and the atomizing gas exiting the corresponding conduit, the liquid and the atomizing gas combine and mix together in the mixing chamber to form liquid droplets and a mixture of the atomizing gas and the liquid.

Additionally, the formed liquid droplets and the mixture of the atomizing gas and the liquid may be discharged through a discharge channel of the feed injector at an end of the mixing chamber opposite the flow cone. In one or more embodiments, the liquid droplets and the mixture of the atomizing gas and the liquid may be discharged into a vertically disposed riser reactor, for example.

One skilled in the art will appreciate how, as compared to conventional feed injectors or nozzles, embodiments herein possess one or more of the following advantages:

Reduced turbulence in an inlet oil conduit due to smoother flow transition by flowing over a flow cone instead of an orifice or any other abrupt change in other designs, consequently resulting in less liquid-side pressure drop.

Oil exiting a conduit to form a jet or uniform annular thin film significantly increases a contact area between oil and atomizing gas, facilitates in primary atomization or oil breakup. Simultaneously an angle at which atomizing gas hits oil ligament may be optimized to achieve best oil breakup and finest oil droplets. This results in that the embodiments herein may require less pressure drop and/or less atomizing gas to achieve same atomization performance as compared to the conventional feed injectors or nozzles.

Achieves better turn down ratios as oil and steam are introduced separately and both flow rates may be reduced or increased to a larger extent due to better oil/steam contact, mixing feature in the embodiments herein while keeping the oil droplet size within requirement.

A finer liquid droplet and/or a better reactor performance.

A lower liquid-side pressure drop and a reduction in capital and operation cost.

In summary, embodiments herein are directed toward a new feed injectors or nozzles useful for fluid catalytic cracking ("FCC"). However, the new feed injectors or nozzles may be generally used for liquid/liquid, gas/liquid or gas/gas concurrent or countercurrent flow in the presence of hydrocarbons. It is further envisioned that the new feed injectors or nozzles may be used in other liquid injection applications in different industries other than FCC. In a non-limiting example, the new feed injectors or nozzles may be used as a water quench nozzle, such as for E-GAS technology, available from Lummus Technology LLC (Houston, Tex.).

While the present disclosure has been described with respect to a limited number of embodiments, those skilled in the art, having benefit of this disclosure, will appreciate that other embodiments may be devised which do not depart from the scope of the disclosure as described herein. Accordingly, the scope of the disclosure should be limited only by the attached claims.

What is claimed:

1. A feed injector, comprising:
   a body having an outer wall and an inner wall;
   a first conduit formed between the outer wall and the inner wall, the first conduit configured to receive a atomizing gas;
   a second conduit formed by the inner wall, the second conduit configured to receive a liquid, wherein the first conduit and the second conduit are separated by the inner wall;
   a mixing chamber at an outlet of the first conduit and an outlet of the second conduit, wherein the atomizing gas from the first conduit and the liquid from the second conduit hit and/or mix together in the mixing chamber to form liquid droplets and a mixture of the atomizing gas and the liquid;
   a flow cone having a first end in the second conduit and a second end in the mixing chamber;
   an annular path between the inner wall of the second conduit and an outer surface of the flow cone forms a liquid pathway to the outlet of the second conduit, wherein the outlet of the second conduit is form by a gap between an end of the inner wall and the second end of the flow cone,
   wherein a protrusion at the second end of the flow cone is angled from a central axis of the feed injector at an angle from 0 to 90 degrees; and
   a discharge channel at an end of the mixing chamber opposite the flow cone.

2. The feed injector of claim 1, further comprising a plurality of vanes on a portion of the outside wall of the flow cone.

3. The feed injector of claim 2, wherein the plurality of vanes are configured to change a direction of the liquid in the liquid pathway.

4. The feed injector of claim 1, further comprising one or more impingement plates extend a length from the outer wall towards the central axis within the mixing chamber.

5. The feed injector of claim 4, wherein the one or more walls are angled at an angle from the outer wall, and the angle is equal to the angle of the gap.

6. The feed injector of claim 1, wherein the outer surface of the flow cone is angled to have the liquid pathway get progressively smaller from the first end of the flow cone to the second end of the flow cone.

7. The feed injector of claim 1, wherein the angle of the protrusion is in the range from 30 to 90 degrees.

8. The feed injector of claim 1, wherein the angle of the protrusion is from 45 to 75 degrees.

9. The feed injector of claim 1, wherein the atomizing gas is steam.

10. The feed injector of claim 1, wherein the liquid is a hydrocarbon.

11. The feed injector of claim 1, further comprising an inlet of the second conduit provided at an end opposite of the discharge channel.

12. The feed injector of claim 11, further comprising an inlet of the first conduit provided between the inlet of the second conduit and the discharge channel.

13. The feed injector of claim 12, wherein the inlet of the first conduit is perpendicular to the central axis and the inlet of the second conduit is parallel to the central axis.

14. The feed injector of claim 1, wherein the outer wall, the inner wall, the first conduit, and the second conduit are coaxial to the central axis.

15. The feed injector of claim 1, wherein the outlet of the first conduit is angled to form an angle of attack for the atomizing gas between 0 to 90 degrees.

16. A fluid catalytic cracking unit, comprising:
   a vertically disposed riser reactor;
   a regenerator fluidly coupled to and configured to provide a catalyst or hot particles to the vertically disposed riser reactor;
   one or more feed injectors disposed in the vertically disposed riser reactor, the feed injectors comprising:
      a body having an outer wall and an inner wall;
      a first conduit formed between the outer wall and the inner wall, the first conduit configured to receive an atomizing gas;
      a second conduit formed by the inner wall, the second conduit configured to receive a liquid feed, wherein the first conduit and the second conduit are separated by the inner wall;
      a mixing chamber at an outlet of the first conduit and an outlet of the second conduit, wherein the atomizing gas from the first conduit and the liquid from the second conduit mix together in the mixing chamber to form liquid droplets and a mixture of the atomizing gas and the liquid;
      a flow cone having a first end in the second conduit and a second end in the mixing chamber;
      an annular path between the inner wall of the second conduit and an outer surface of the flow cone forming a liquid pathway to the outlet of the second conduit, wherein the outlet of the second conduit is formed by a gap between an end of the inner wall and the second end of the flow cone,
      wherein a protrusion at the second end of the flow cone is angled from a central axis of the feed injector at an angle from 0 to 90 degrees; and
      a discharge channel at an end of the mixing chamber opposite the flow cone,
   wherein the liquid droplets and the mixture of the atomizing gas and the liquid enter the vertically disposed riser reactor through the discharge channel of the one or more feed injectors.

17. The fluid catalytic cracking unit of claim 16, wherein the one or more feed injectors are disposed proximate a bottom of the vertically disposed riser reactor.

18. A method, comprising:

flowing an atomizing gas through a first conduit of a feed injector;

flowing a liquid through a second conduit of the feed injector, wherein the first conduit and the second conduit are separated by a wall within the feed injector;

directing the liquid through a liquid pathway formed by an annular path between the wall and an outer surface of a flow cone within the feed injector, wherein the liquid travels from a first end of the flow cone in the second conduit to a second end the flow cone in a mixing chamber of the feed injector;

exiting the liquid into the mixing chamber through an outlet of the second conduit formed a gap between an end of the wall and the second end of the flow cone, distributing the liquid into the mixing chamber with a protrusion at the second end of the flow cone angled from a central axis of the feed injector at an angle from 0 to 90 degrees;

exiting the atomizing gas into the mixing chamber through an outlet of the first conduit;

combining the liquid from the second conduit and the atomizing gas from the first conduit in the mixing chamber to form liquid droplets resulting in a mixture of the atomizing gas and the liquid droplets; and discharging the mixture of the atomizing gas and the liquid droplets through a discharge channel of the feed injector at an end of the mixing chamber opposite the flow cone.

19. The method of claim 18, further comprising changing a direction of the liquid flow in the liquid pathway with a plurality of vanes on a portion of the outer surface of the flow cone.

20. The method of claim 18, further comprising premixing a portion of the atomizing gas with the liquid within the second conduit upstream of the flow cone.

* * * * *